United States Patent Office 3,048,644
Patented Aug. 7, 1962

3,048,644
CADMIUM ELECTRODES FOR GALVANIC CELLS
Joachim Euler, Frankfurt am Main, Germany, assignor to Pertrix-Union Gesellschaft mit Beschraenkter Haftung, Ellwangen, Jagst, Germany, a company of Germany
No Drawing. Filed Nov. 20, 1959, Ser. No. 854,235
Claims priority, application Germany Dec. 4, 1958
12 Claims. (Cl. 136—83)

The present invention relates to improvements in the manufacture of cadmium electrodes for galvanic cells which preferably contain an alkaline electrolyte.

Galvanic elements with an alkaline electrolyte and an electrode the active material of which is cadmium are known. However, since cadmium is practically insoluble in the alkaline electrolyte, special methods must be devised to prepare such cadmium electrodes.

In cadmium storage batteries, this poses no particular economic problem. The plates are produced from cadmium compounds, such as cadmium oxides or hydroxides, which are converted into porous plates with a large cadmium surface during formation.

These manufacturing procedures are economically not feasible in the production of cadmium electrodes for primary cells. For this purpose, metallic cadmium in powder form or in the form of wool-like fibers must be pressed, sintered, or rolled to produce a porous electrode. It has also been proposed to deposit cadmium on a carrier of a different metal to obtain the desired electrode. However, while cadmium electrodes produced in this manner have a large cadmium surface, they have shown a relatively high polarization, which may be produced by surface films formed on the cadmium when exposed to air.

In galvanic cells using zinc, lead, and other metals soluble in the alkaline electrolyte, oxide films on the surface of the electrode disappear with the formation of zinc, lead, and other metal salts. But the electrolyte does not remove such surface films from cadmium.

It is accordingly an object of the present invention to provide a cadmium electrode for galvanic cells, which has a low polarization and displays a uniform discharge curve.

It is a concomitant object of this invention to provide an improved method of manufacturing such cadmium electrodes.

The above and other objects are accomplished in accordance with the invention by producing a galvanic cell electrode from a mixture of cadmium powder and a powder of a less noble metal, such as zinc or aluminium the cadmium and other metal powder particles being so pressed and/or sintered together that the particles of cadmium and the other metal retain their identity in the electrode.

The production of porous electrodes with a large surface from metal powders is well known in the art of powder metallurgy and any of the known heat treating methods may be used in the manufacture of the present electrodes.

A range of 0.1% to 5.0%, by weight of the cadmium, of the less noble metal powder has been found advantageous, the preferred percentage being about 1.0% of the additive.

Zinc is the preferred less noble metal.

Preferably, the grain size of the cadmium powder ranges between about 0.05 mm. and 0.5 mm., the preferred range being between 0.1 mm. and 0.3 mm. If desired, mixtures of cadmium powders of different grain sizes may be used. A mixture of 30% to 90%, preferably of 60% to 80%, of a cadmium powder with a grain size between 0.1 mm. and 0.3 mm. and 10% to 70%, preferably 20% to 40%, of a cadmium powder of a grain size of $30\mu$ to $40\mu$ has been found to be advantageous. This mixture is combined with the desired amount of a powder of a less noble metal, such as zinc, and the complete mixture is then heat treated to obtain the electrode.

The effectiveness of such an electrode may be further increased if the cadmium powder and/or the other metal powder is amalgamated in a manner known per se.

While in no way limiting the invention thereto, the following examples will illustrate its principles, all percentages being by weight.

*Example 1*

80% of a cadmium powder having a grain size between 0.1 mm. and 0.3 mm. are mixed with 19% of a cadmium powder with a grain size between $30\mu$ and $40\mu$. About 1% of a zinc powder is added to this mixture. All three components are well mixed and the powder mixture is pressed at a pressure of about 1000 kg./cm.$^2$ to obtain a galvanic cell electrode of the desired shape and porosity.

*Example 2*

76% of a cadmium powder having a grain size between 0.1 mm. and 0.3 mm. is amalgamated with 4% mercury and 19% of a fine cadmium powder with a grain size of about $40\mu$ is mixed therewith. To this mixture there is added 1% of zinc powder, the whole being well mixed. The mixture is then heat treated at a temperature of about 280° C.

While specific pressures and temperatures have been set forth in the examples, it will be obvious that the heat treatment or sintering conditions may be varied considerably. Acceptable pressures range between 800 and 2000 kg./cm.$^2$ preferably 1000 to 1200 kg./cm.$^2$, while the treatment temperature may vary between about 250 and about 300 degrees centigrade, preferably 270 to 280 degrees.

Also, the porosity of the cadmium electrodes of this invention may be increased, if desired, by mixing its components with an expander, such as carbon black, before subjecting the mixture to the heat treatment.

While the invention has been described with certain now preferred embodiments, it will be clearly understood that many modifications and variations may occur to the skilled in the art without departing from the spirit and scope of the invention as defined in the appended claims.

I claim:

1. A method of manufacturing galvanic cell electrodes comprising the steps of mixing cadmium powder with 0.1% to 5.0%, by weight of the cadmium, of zinc powder and heat treating the mixture under pressure and at a temperature of about 250° C. and 300° C. to form an electrode wherein the particles of the cadmium powder and of the zinc powder retain their identity.

2. The method of claim 1, wherein about 1% of the zinc powder is mixed with the cadmium powder.

3. A method of manufacturing galvanic cell electrodes comprising the steps of mixing a cadmium powder having a grain size of 0.05 mm. to 0.50 mm. with a minor amount of a znic powder and heat treating the mixture under pressure and at a temperature of about 250° C. and 300° C. to form an electrode wherein the particles of the cadmium powder and of the zinc powder retain their identity.

4. The method of claim 3, wherein the grain size of the cadmium powder is between 0.1 mm. and 0.3 mm.

5. A method of manufacturing galvanic cell electrodes, comprising the steps of mixing a cadmium powder having a grain size of 0.05 mm. to 0.50 mm. with a cadmium powder having a grain size between $30\mu$ and $40\mu$, adding thereto a minor amount of a zinc powder, and heat treating the mixture under pressure and at a temperature of about 250° C. and 300° C. to form an electrode wherein the particles of the cadmium powder and of the zinc powder retain their identity.

6. A method of manufacturing galvanic cell electrodes, comprising the steps of mixing amalgamated cadmium powder with a minor amount of a zinc powder and heat treating the mixture under pressure and at a temperature of about 250° C. and 300° C. to form an electrode wherein the particles of the cadmium powder and of the zinc powder retain their identity.

7. A method of manufacturing galvanic cell electrodes, comprising the steps of mixing cadmium powder with a minor amount of an amalgamated zinc powder and heat treating the mixture under pressure and at a temperature of about 250° C. and 300° C. to form an electrode wherein the particles of the cadmium powder and of the amalgamated zinc powder retain their identity.

8. A primary galvanic cell with an alkaline electrolyte and a porous cadmium electrode comprising essentially individual particles of cadmium and a minor amount of individual particles of zinc distributed therethrough, said particles firmly adhering to each other but retaining their identity in said electrode.

9. The primary galvanic cell of claim 8, wherein from 0.1 to 5.0%, based on the weight of the cadmium, of the zinc particles are present in the electrode.

10. The primary galvanic cell of claim 9, wherein about 1.0%, based on the weight of the cadmium, of the zinc particles are present in the electrode.

11. A primary galvanic cell with an alkaline electrolyte and a porous cadmium electrode comprising essentially individual particles of amalgamated cadmium and a minor amount of individual zinc particles distributed therethrough, said particles firmly adhering to each other but retaining their identity in said electrode.

12. A primary galvanic cell with an alkaline electrolyte and a porous cadmium electrode comprising essentially individual cadmium particles and a minor amount of individual amalgamated zinc particles distributed therethrough, said particles firmly adhering to each other but retaining their identity in said electrode.

References Cited in the file of this patent

UNITED STATES PATENTS

| 945,243 | Morrison | Jan. 4, 1910 |

FOREIGN PATENTS

| 8345A | Great Britain | of 1906 |
| 780,481 | Great Britain | Aug. 7, 1957 |